United States Patent [19]

Koide

[11] Patent Number: 5,704,636
[45] Date of Patent: Jan. 6, 1998

[54] AIR BAG APPARATUS

[75] Inventor: Teruhiko Koide, Niwa, Japan

[73] Assignee: Kabushiki Kaisha Tokai-Rika-Denki-Seisakusho, Niwa, Japan

[21] Appl. No.: 754,184

[22] Filed: Nov. 25, 1996

Related U.S. Application Data

[63] Continuation of Ser. No. 567,583, Dec. 5, 1995, abandoned.

[30] Foreign Application Priority Data

Dec. 28, 1994 [JP] Japan .................. 6-327851

[51] Int. Cl.⁶ .................................................. B60R 21/16
[52] U.S. Cl. ............................. 280/728.2; 280/730.1; 280/732
[58] Field of Search ................... 280/728.2, 743.1, 280/730.1, 732

[56] References Cited

U.S. PATENT DOCUMENTS

| | | | |
|---|---|---|---|
| 4,793,631 | 12/1988 | Takada | 280/728.2 |
| 5,131,677 | 7/1992 | Horiuchi et al. | 280/731 |
| 5,180,188 | 1/1993 | Frantz et al. | 280/740 |
| 5,263,738 | 11/1993 | Oda et al. | 280/728.2 |
| 5,362,101 | 11/1994 | Sugiura et al. | 280/728.2 |
| 5,419,584 | 5/1995 | Halford | 280/728.2 |

FOREIGN PATENT DOCUMENTS

| | | |
|---|---|---|
| 8903786 U | 8/1989 | Germany . |
| A-39 34 588 A1 | 4/1991 | Germany . |
| 43 01 193 | 8/1993 | Germany . |
| 6-64492 | 3/1994 | Japan . |
| 2 267 065 | 11/1993 | United Kingdom . |

Primary Examiner—Kenneth R. Rice
Attorney, Agent, or Firm—Oliff & Berridge, P.L.C.

[57] ABSTRACT

An air bag apparatus having a bag body inflated due to gas generated at the time of a sudden deceleration of a vehicle;
 a plate for holding the bag body;
 an oblong hole formed at a portion of the bag body where the bag body is not inflated;
 a rivet inserted into the oblong hole; and
 a pressing piece for holding the bag body via the rivet between the bag body and the plate in a state in which the bag body is not inflated when the vehicle is running at an ordinary state and for pressing the bag body so as to allow the bag body to be inflated when the vehicle suddenly decelerates. As a result, the bag body is moved along the longitudinal direction of the oblong hole when the vehicle suddenly decelerates, allowing the bag body to be inflated.

20 Claims, 9 Drawing Sheets

AIR BAG APPARATUS

This is a Continuation of application Ser. No. 08/567,583 filed Dec. 5, 1995, now abandoned.

BACKGROUND OF THE INVENTION

1. Field of the Invention

The present invention relates to an air bag apparatus mounted to a vehicle and more particularly, to an air bag apparatus suitably applied for the knees of a vehicle occupant.

2. Description of the Related Art

Generally, a method for attaching a shock absorbing pad to a vehicle body is known to protect the knees of a vehicle occupant. Such a shock absorbing pad is adapted to absorb kinetic energy of the vehicle occupant due to an inertia force generated when the vehicle suddenly decelerates. A pad of this type is made of a shock absorbing material such as a cushion or the like. For example, a pad for a front seat facing the knees of the vehicle occupant is mounted beneath a dashboard in the forward direction of the seat and the pad for a rear seat is mounted beneath the backrest of the front seat. Mounting a pad of this type to the vehicle body allows the pad to absorb the energy generated by the vehicle occupant when the vehicle occupant is forcibly moved in an advance direction of the vehicle due to the inertia force generated when the vehicle suddenly decelerates and strikes his or her knees against the vehicle.

Alternatively, a method for mounting an air bag apparatus to a vehicle body is provided. An air bag apparatus of this type is arranged almost in the same way as that of the type which is mounted to a steering wheel pad or the like. The air bag apparatus is equipped with an inflator having an activating device for generating gas when the vehicle suddenly decelerates and a gas generating material or the like. At the vehicle occupant side of the inflator, a bag body is disposed to inflate at the vehicle occupant side due to the gas generated by the inflator. The bag body is folded such that an opening side thereof is directed towards the side which opposes to the vehicle occupant side. The inflator and the bag body are mounted on a plate-shaped bag holder which is fastened to the vehicle body. Similarly to the aforementioned shock absorbing pad, the plate-shaped bag holder for the front seat facing the knees of the vehicle occupant is mounted beneath the dashboard in the forward direction of the seat and the plate-shaped bag holder for the rear seat is mounted beneath the backrest of the front seat. At the time of a sudden deceleration of the vehicle, an activating device of the inflator ignites a gas generating material to generate a great amount of gas. The gas is guided inside the bag body and causes the bag body to inflate in the forward direction of the knees of the vehicle occupant. It should be noted that the bag body inflated due to the gas is allowed to absorb the energy generated when the knees of the vehicle occupant strike the vehicle body due to the inertia force generated when the vehicle suddenly decelerates.

However, in a case where the shock absorbing pad or the air bag apparatus as described above is mounted to the aforementioned positions, since the space between a vicinity of the knees of the vehicle occupant and the vehicle body is made smaller, the vehicle occupant might feel uncomfortable.

Namely, in a case the shock absorbing pad is mounted to the vehicle body, a sufficient effect as a pad can be obtained by using the pad as thick as possible and making the space as small as possible between the knees of the vehicle occupant and the pad. Meanwhile, it should be noted that using a thickened pad for minimizing the space between the pad and the knees of the vehicle occupant will sacrifice the space between a vicinity of the knees of the vehicle occupant and the vehicle body. Accordingly, in a case the pad is mounted to the vehicle body, it becomes difficult for the vehicle occupant to change the knees or stretch out his or her legs, so that it is possible that the vehicle occupant might feel uncomfortable.

Further, in a case an air bag apparatus of the same type as that for a conventional steering wheel pad is mounted to a vehicle body, it is necessary to have a space for equipping the vehicle body with an air bag apparatus. In particular, in a case of mounting an air bag apparatus for the vehicle occupant sitting on the rear seat, the air bag apparatus should be mounted to the backrest of the front seat and located at a position where the air bag apparatus will not interfere the vehicle occupant sitting on the front seat. In this way, the range in which the air bag apparatus is mounted is naturally limited, thereby making the space between a vicinity of the knees of the vehicle occupant and the vehicle body smaller. As a result, the vehicle occupant might feel uncomfortable in the same way as the case in which a shock absorbing pad is mounted to the vehicle body.

In view of the aforementioned, it is an object of the present invention to provide an air bag apparatus in which it is possible to obtain a sufficient space between the vehicle occupant and the vehicle body.

SUMMARY OF THE INVENTION

According to a first aspect of the present invention, there is provided an air bag apparatus comprising a bag body inflated to a vehicle occupant side due to gas generated by an inflator when the vehicle suddenly decelerates, a plate-shaped bag holder supporting said bag body and mounted to the vehicle body, and a connecting means for connecting said bag body to said plate-shaped bag holder such that said bag body is movable within a predetermined range, thereby allowing said bag body to inflate.

In the air bag apparatus according to the above aspect, the bag body is mounted on the plate-shaped bag holder by the connecting means and it is inflated to the vehicle occupant side due to the gas generated by the inflator. At this point, the bag body is mounted on the plate-shaped bag holder by the connecting means such that the bag body is movable within a predetermined range, thereby allowing said bag body to inflate. Upon the activation of the inflator, the bag body is moved to inflate due to the gas. Namely, the bag body is inflated to the vehicle occupant side by moving the connecting position where the bag body is connected to the plate-shaped bag holder, for example, by making the connected positions which oppose each other approach each other. For this reason, since the air bag apparatus can accommodate the bag body without folding the entire bag body into a number of layers, it is possible to make the apparatus thinner. As a result, a sufficient space between the vehicle occupant and the vehicle body can be obtained when the vehicle is running at an ordinary state.

Further, said connecting means includes an oblong hole provided in said bag body, an axis member inserted into said oblong hole, and a pressing member engaged at one end of said axis member and pressing said bag body so as to hold said bag body between the same and said plate-shaped bag holder in uninflated state when the vehicle is running at an ordinary state and to allow said bag body to move along the longitudinal direction of said oblong hole when the vehicle suddenly decelerates.

DESCRIPTION OF THE PREFERRED EMBODIMENTS

Figure 1:
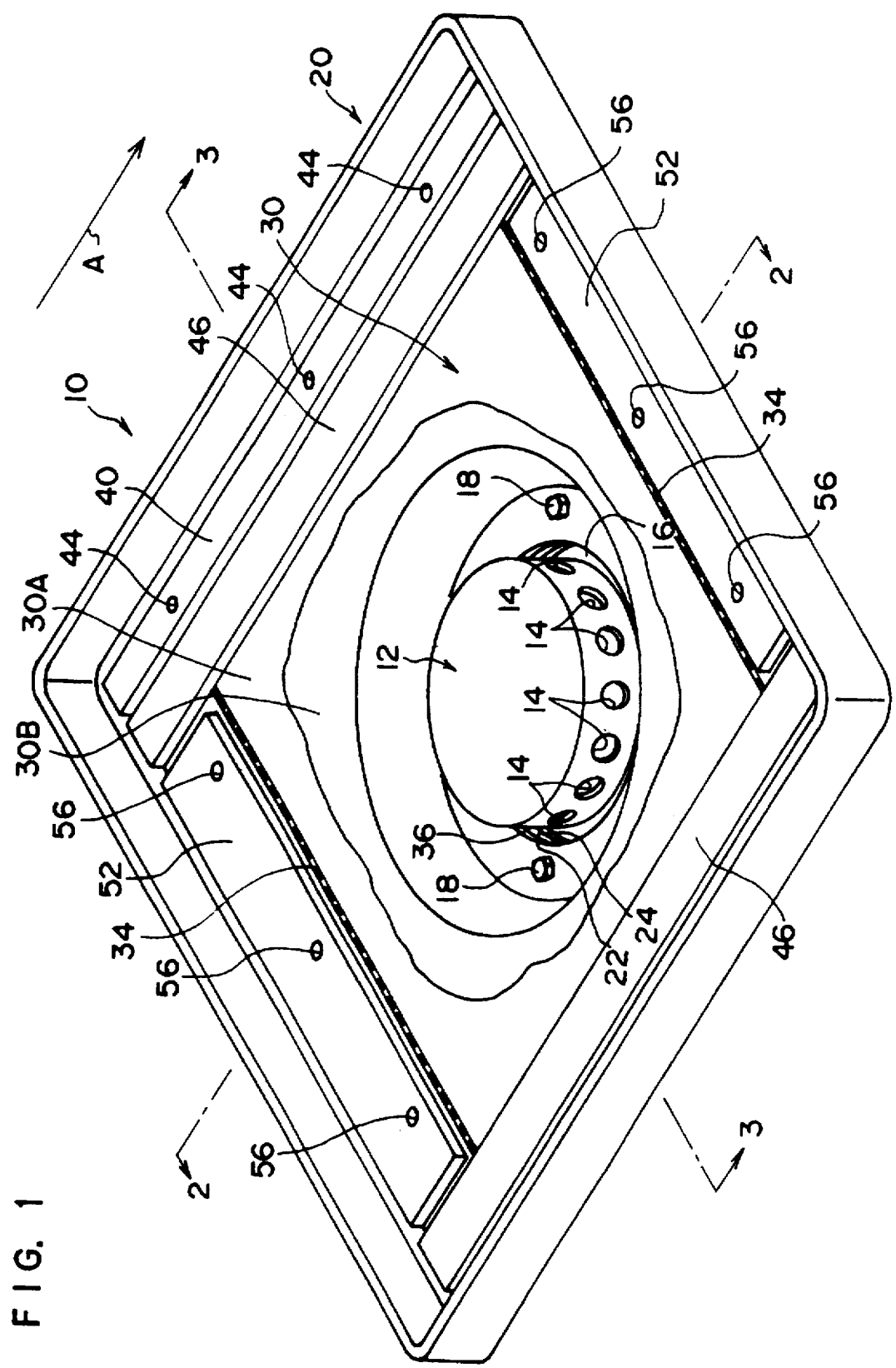
FIG. 1 is a perspective view showing an arrangement of an air bag apparatus according to the first embodiment of the present invention.
Figure 2:
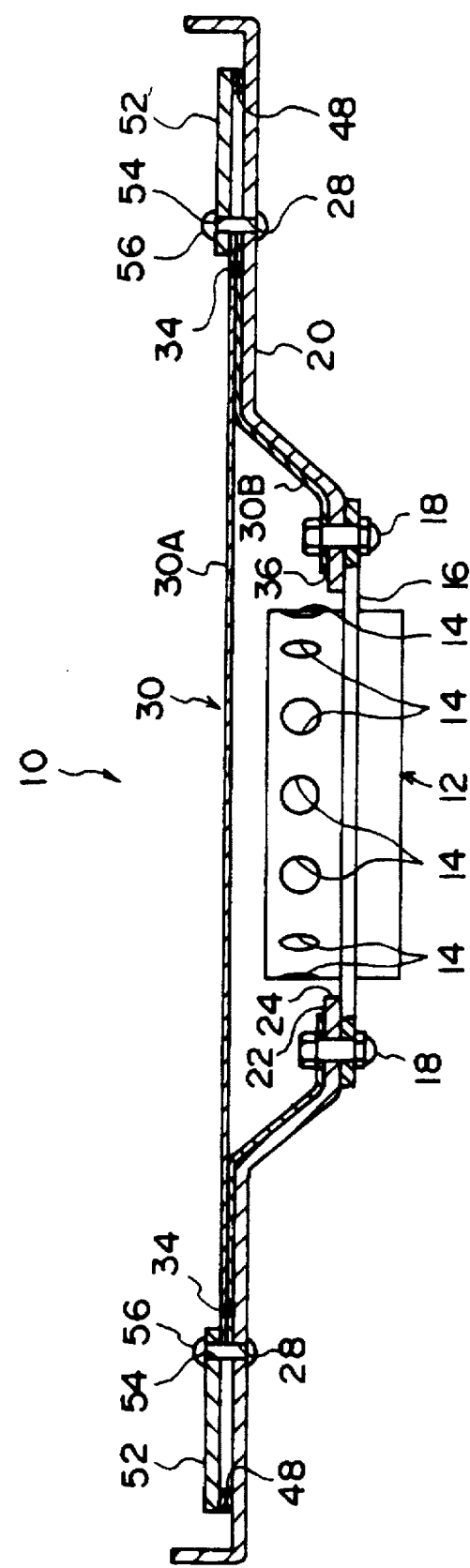
FIG. 2 is an end face view taken along the line 2—2 of FIG. 1.
Figure 3:
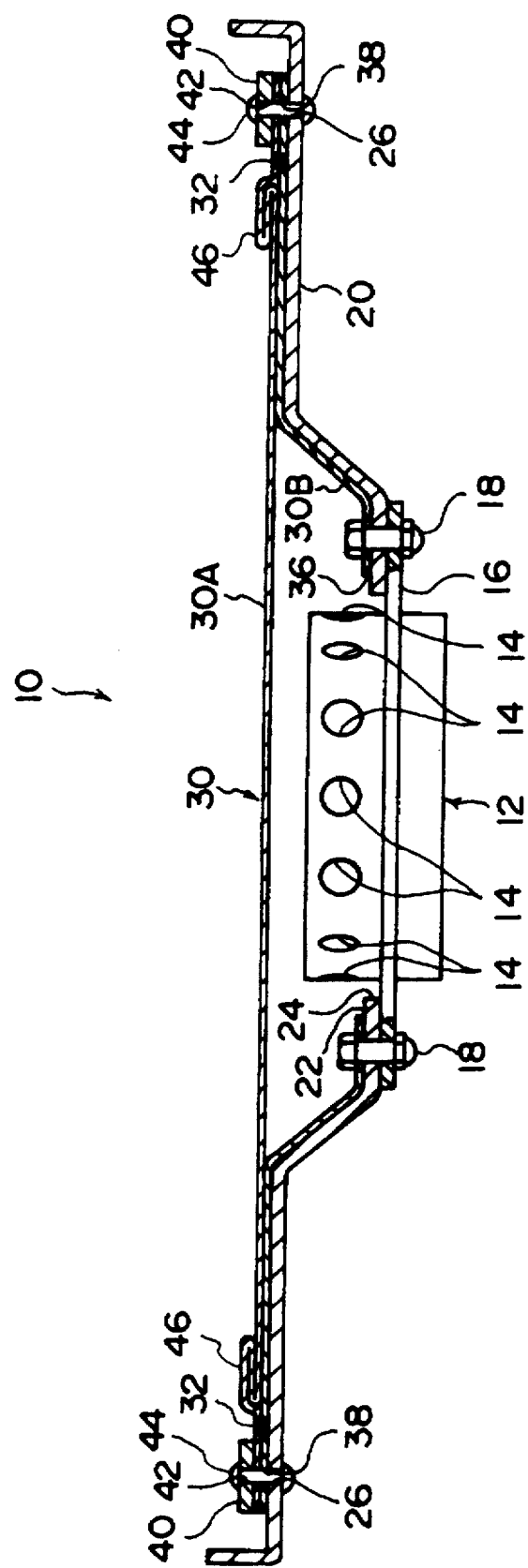
FIG. 3 is an end face view taken along the line 3—3 of FIG. 1.
Figure 4:
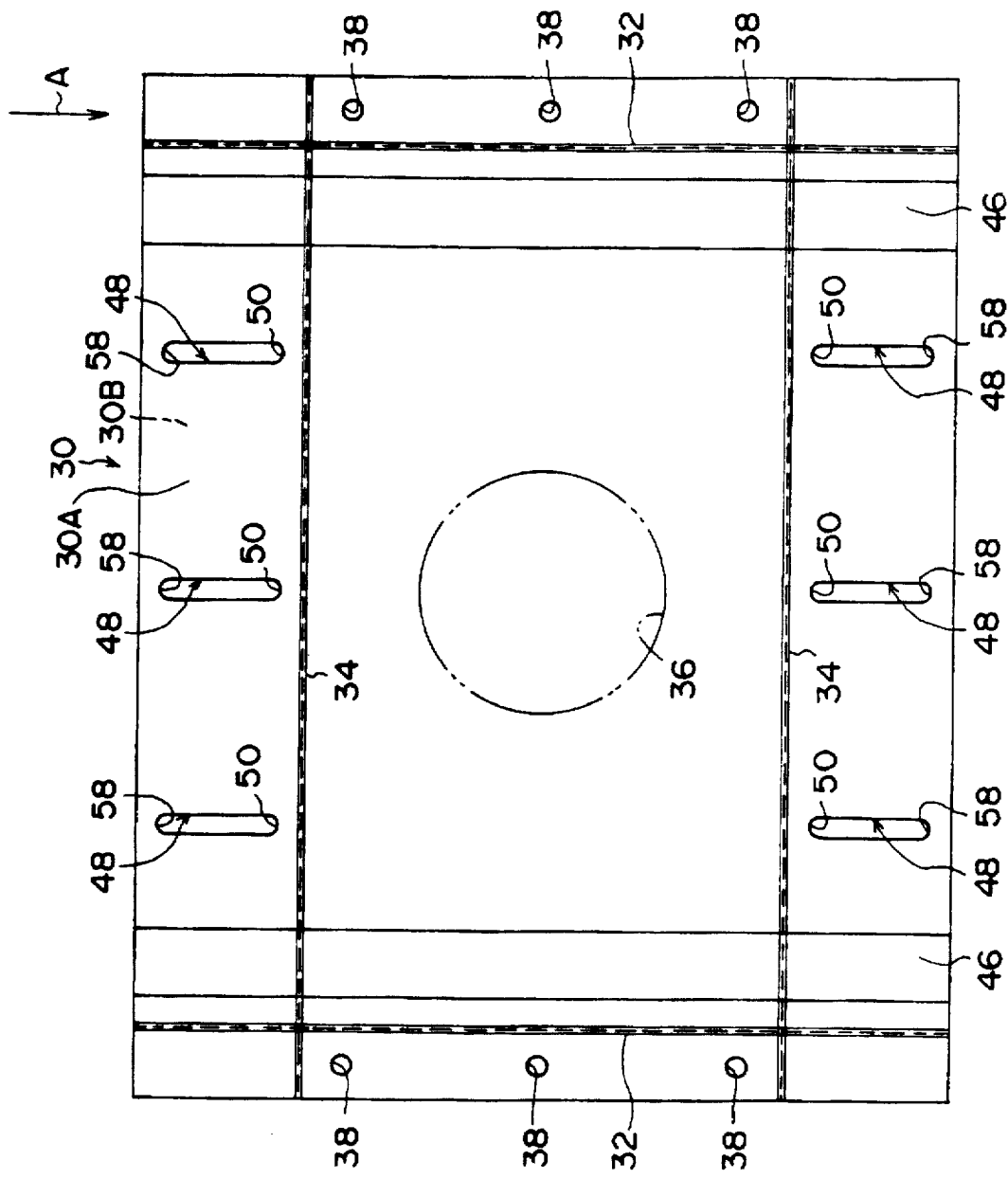
FIG. 4 is a plan view of a bag body shown in FIG. 1.

FIG. 1 shows a perspective view of an air bag apparatus 10 according to a first embodiment of the present invention. FIG. 2 shows an end face view taken along a line 2—2 in FIG. 1. FIG. 3 shows an end face view taken along a line 3—3 in FIG. 1. FIG. 4 shows a plan view of a bag body 30 of FIG. 1.

The air bag apparatus 10 is provided with an inflator 12 which generates gas by detecting a state in which the vehicle suddenly decelerates. The inflator 12 is substantially in the shape of a cylinder and it accommodates an actuator, a detonator, a booster, a gas generating material and a filter which are not shown in the drawings. A plurality of gas-discharging holes 14 are formed on a portion of an outer circumferential surface which is positioned close to a vehicle occupant along the axis of the inflator 12 (an upper portion of the inflator in FIG. 2) and they are arranged such that the gas generated inside of the inflator 12 is discharged outside thereof. A circular flange 16 is also formed at the outer circumferential surface of the intermediate portion of the inflator 12 so as to extend to an radial direction thereof and is fixed to a plate-shaped bag holder 20 by bolts 18.

The plate-shaped bag holder 20 is a member formed in the shape of a box opened upwardly and provided with a step portion 22 recessed in the direction opposite the vehicle occuapnt of the plate-shaped bag holder 20 in the shape of a circle at the central portion thereof. A circular hole 24 is formed at the central portion of the step portion 22 and the inflator 12 is disposed so as to penetrate from the anti-vehicle occupant side of the plate-shaped bag holder 20. In addition, at the bottom of the plate-shaped bag holder 20, a plurality of through holes 26 are formed on both sides along the direction of arrow A, while a plurality of through holes 28 are formed on both sides along the directions perpendicular to the arrow A. A bag body 30 is disposed at the vehicle occupant side of the plate-shaped bag holder 20 so as to inflate due to the gas generated by the inflator 12.

The bag body 30 is made of upper cloth 30A and lower cloth 30B, both of which are stitched together and incorporated at each of the stitched portions 32 and 34. A circular hole 36 is formed at the central portion of the lower cloth 30B. The inflator 12 is inserted into the circular hole 36. The lower cloth 30B is secured to the plate-shaped bag holder 20 together with the inflator 12 by the bolts 18 outside of the circular hole 36.

Through holes 38 corresponding to through holes 26 formed on the plate-shaped bag holder 20 are formed on the upper cloth 30A and the lower cloth 30B outside the stitched portion 32 along the direction of arrow A of the bag body 30. In addition, plate attachments 40 each serving as a pressing member are placed at the vehicle occupant side of the through holes 38. Each of the plate attachments 40 is a member formed in the shape of a rectangular and is provided with through holes 42 corresponding to the through holes 26. Rivets 44 are respectively inserted into the through holes 26, 38 and 42 such that the edge of the bag body 30 is pressed and maintained on the plate-shaped bag holder 20 by the plate attachments 40. Further, a folded portion 46 in which a part of the upper cloth 30A is folded into layers is formed inside of the stitched portion 32 of the bag body 30. The folded portion 46 is arranged so as to be unfolded when the bag body 30 is inflated.

Meanwhile, oblong holes 48, which serve as the connecting means and whose longitudinal directions run along the direction of arrow A, are formed in both the upper cloth 30A and the lower cloth 30B inserted into the portions of the bag body 30 which are positioned outside of the stitched portions 34 perpendicular to arrow A. It should be noted that each of the innerside inner edge 50 of the oblong holes 48 of the bag body 30 will correspond to each of the through holes 28 of the plate-shaped bag holder 20 when the bag body 30 is mounted on the plate-shaped bag holder 20. In addition, each of plate attachments 52 is placed at the vehicle occupant side of the oblong holes 48 of the bag body 30. The plate attachment 52 is a member formed in the shape of a rectangular plate similarly to each of the plate attachments 40 and is equipped with through holes 54 corresponding to the through holes 28.

An axis member such as a rivet 56 or the like serving as a connecting means is inserted into each of the through holes 28, 54 and the oblong hole 48, and the end portion of the bag body 30 is pressed to the plate-shaped bag holder 20 by a pressing force of the plate attachment 52 in such a degree that the bag body 30 is movable when a predetermined amount or more of force acts upon the bag body 30. Namely, when the vehicle is running at an ordinary state, the through holes 28 of the plate-shaped bag holder 20 are positioned beneath the innerside inner edges 50 of the oblong holes 48, while the through holes 54 of the plate attachment holder 52 are positioned on the innerside inner edges 50 of the oblong holes 48. As a result, the rivet 56 is inserted in the vicinity of each of the innerside inner edges 50 of the oblong holes 48.

The rivet 56 is inserted into each of the through holes 28, 54 and the oblong holes 48. The bag body 30 is pressed by a pressing force of the plate attachments 52 in such a degree that the bag body 30 is movable when the above-stated force acts upon the bag body 30. As a result, the bag body 30 is able to move with relation to the plate-shaped bag holder 20 until an outerside inner edge 58 of the oblong hole 48 of the bag body 30 abuts on the rivet 56.

Next, operation of the first embodiment will be described.

For example, the air bag apparatus 10 with the arrangement described above is mounted beneath the dashboard of the vehicle body corresponding to the vehicle occupant sitting on the front seat, or at the rear face side of the backrest of the front seat corresponding to the vehicle occupant sitting on a rear seat. When the vehicle is running at an ordinary state, the bag body 30 is mounted on the plate-shaped bag holder 20 in a state in which two portions of the upper bag body 30A are folded. In addition, at the outside of the stitched portion 34 of the bag body 30, the oblong hole 48 is set in a state in which the rivet 56 is inserted into the innerside inner edges 50 of the oblong hole 48 of the bag body 30, that is, the oblong hole 48 is positioned as defined by a point B and a point C shown in FIG. 6. The bag body 30 is also pressed by a pressing force in such a degree that the bag body 30 is movable in relation to the plate-shaped bag holder 20 and it is supported on the plate-shaped bag holder 20.

Hence, when the vehicle suddenly decelerates, the activating device of the inflator 12 is activated. The gas generating material is brought into combustion due to the ignition of the detonator and a great amount of gas is generated via a booster. After the gas is cooled and fragments contained in the gas are removed from the gas by a filter, the gas is guided into the bag body 30 via the gas-discharging holes 14 so that the bag body 30 inflates. At this time, at the inside of the stitched portion 32 of the bag body 30, the folded portion 46 of the bag body 30 is unfolded due to the introduction of the gas to the bag body 30.

Figure 5:
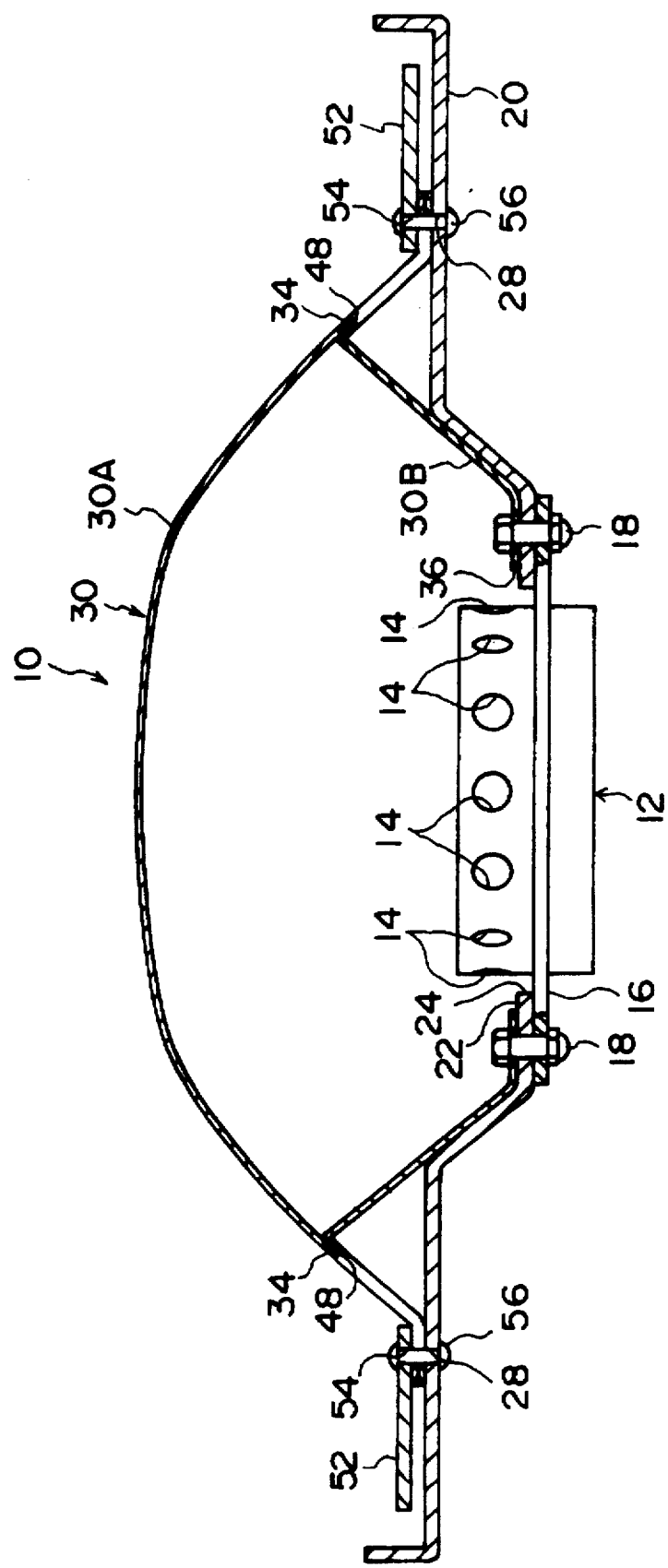
FIG. 5 is an end face view corresponding to FIG. 3 and showing the state of the bag body after the bag body is inflated.
Figure 6:
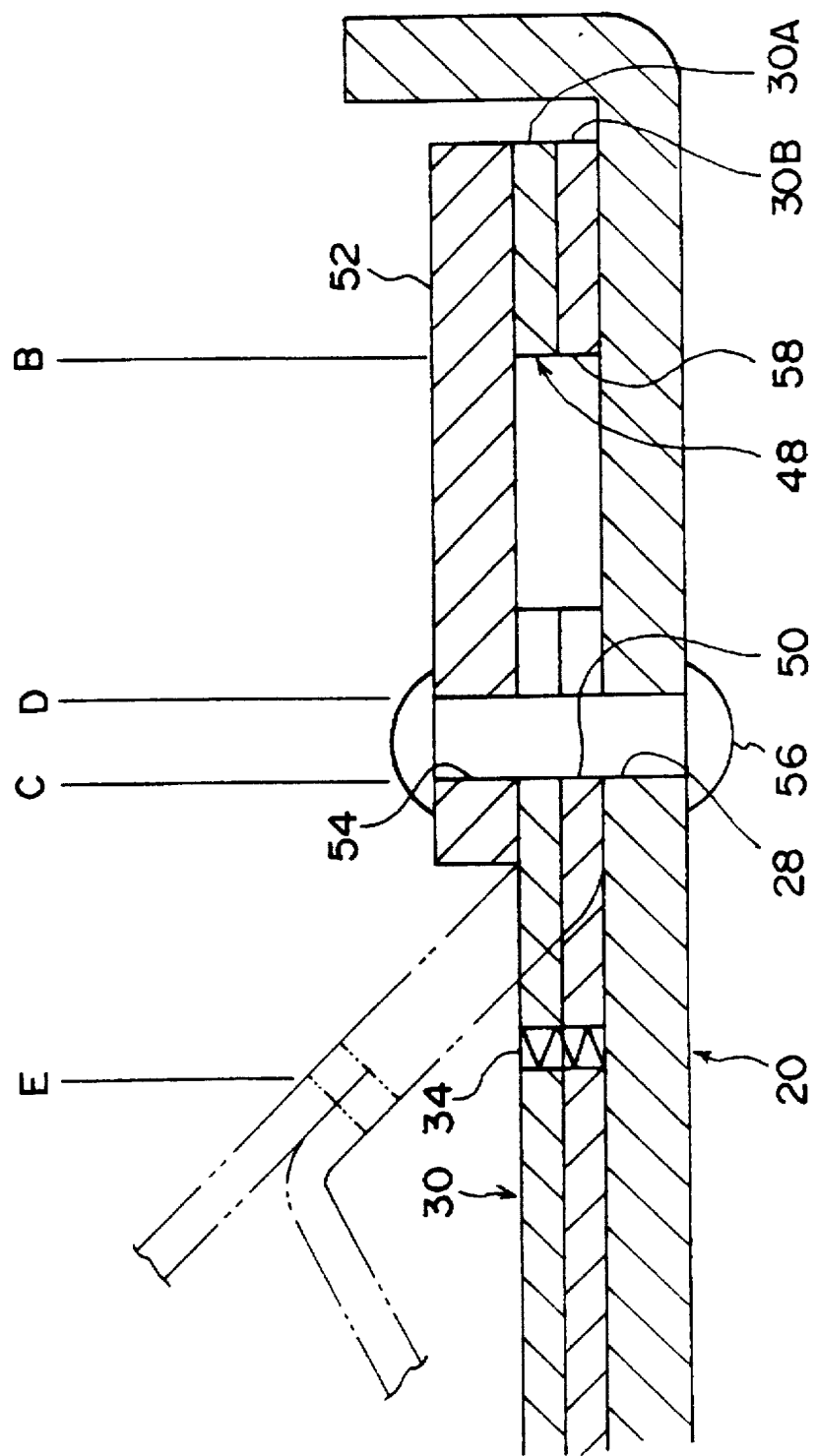
FIG. 6 is an end face view in which an oblong portion of the bag body of FIG. 5 is enlarged.

On the other hand, the portion at the outer side of the stitched portion 34 of the bag body 30 is also pulled by the gas and inflated, as shown in FIG. 5 and 6. Before the inflation, the oblong hole 48 was positioned as defined by the points B, C shown in FIG. 6. However, when the bag body 30 is pulled by the gas, the oblong hole 48 moves until the outerside inner edge 58 of the oblong hole 48 of the bag body 30 abuts on the rivet 56 or until the oblong hole 48 reaches to a position as defined points D, E shown in FIG. 6. As a result, it represents the state in which the bag body 30 is illustrated by the phantom line is shown. Accordingly, at the outside of the stitched portion 34 of the bag body 30, the bag body 30 is inflated by an amount corresponding to a distance by which the rivet 56 is relatively moved within the oblong hole 48. The bag body 30 thus inflated inflates towards the knees of the vehicle occupant in such a manner as to absorb the energy occurring when the vehicle body will be struck by the knees of the vehicle occupant.

In this way, in the first embodiment, the bag body 30 is provided with the oblong holes 48 so as to move in relation to the plate-shaped bag holder 20. For this reason, the folding amount of the bag body 30 can be lreduced and the apparatus can be made thinner. As a result, it is possible to obtain a sufficient space between the vehicle occupant and the vehicle body.

In the first embodiment, the oblong holes 48 are formed on the portions of the bag body 30 which are outside two opposing stitched portions 34. However, each of the oblong holes 48 is formed on one of the two portions, while ordinary through holes or circular holes may be formed on the other. Alternatively, the oblong holes 48 may be formed on one of the two portions 34 and a portion of the bag body 30 may be folded into layers inside of the stitched portions 34. Also in this case, the folding amount of the bag body 30 can be reduced and the apparatus can be made thinner.

Next, a second embodiment of the present invention will be described. It should be noted that the same reference numerals are applied to the parts or components that are similar to the first embodiment, and the description thereof is omitted.

Figure 7:
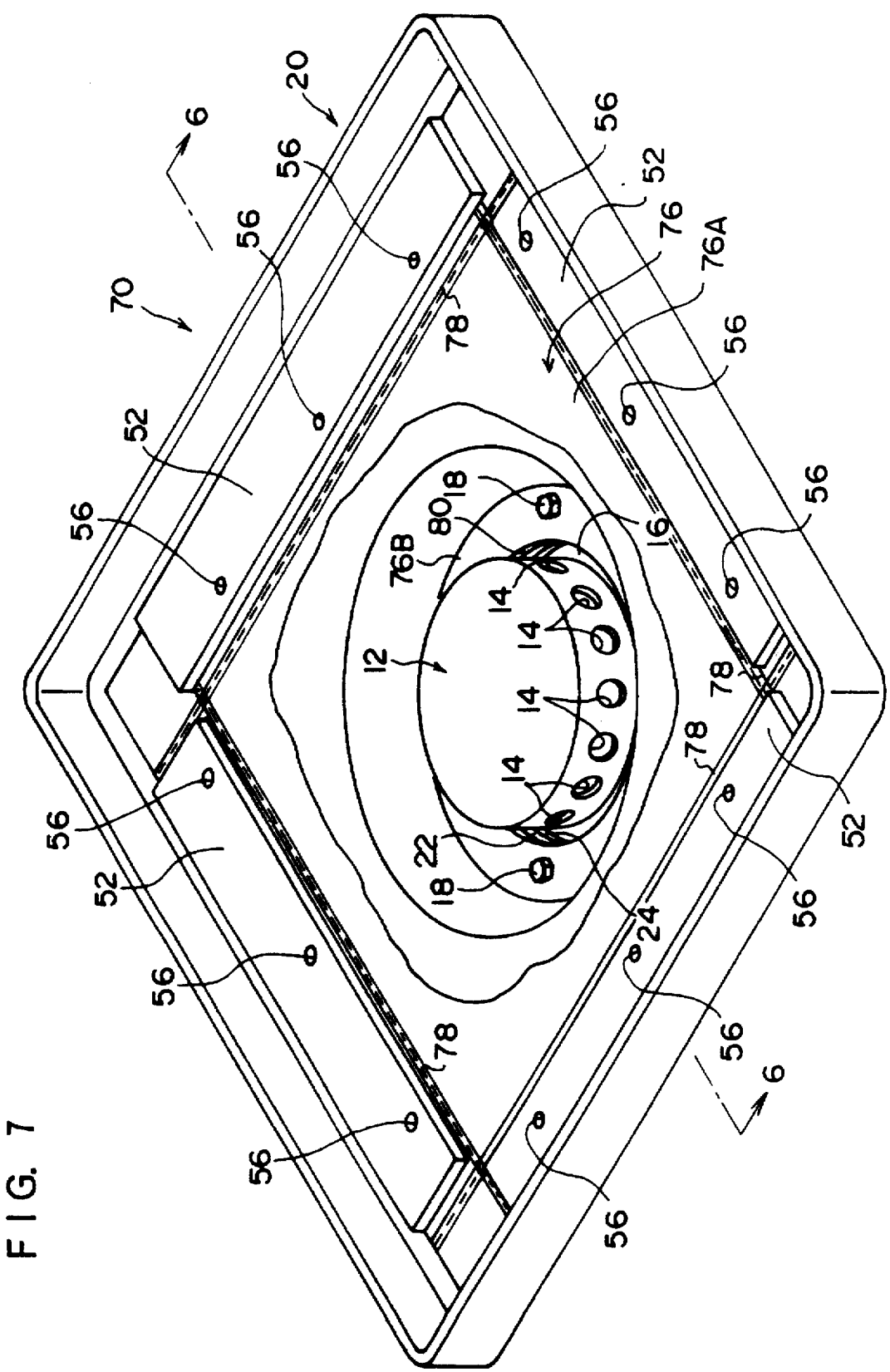
FIG. 7 is a perspective view showing an arrangement of an air bag apparatus according to the second embodiment of the present invention.
Figure 8:
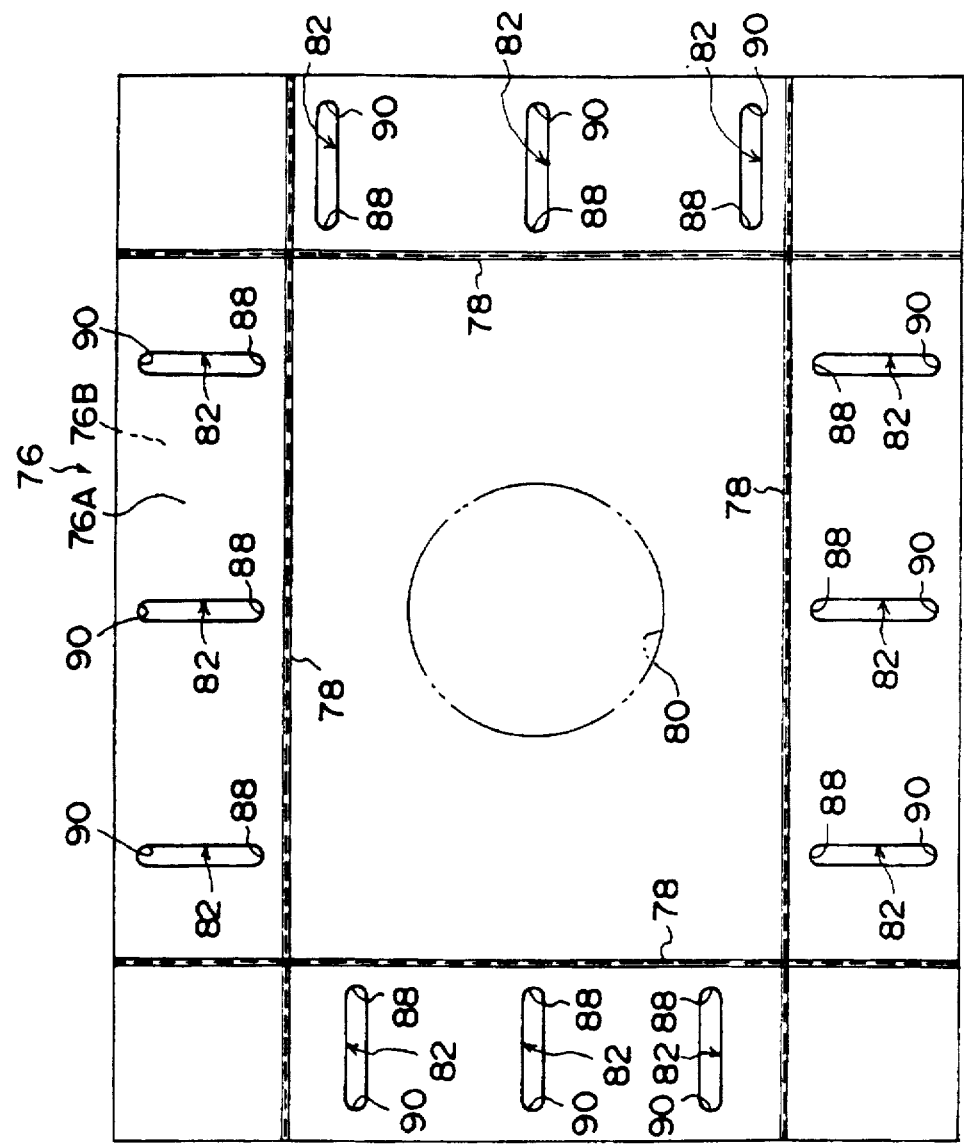
FIG. 8 is a plan view showing the bag body of FIG. 7.

FIG. 7 shows a perspective view of an air bag apparatus 70 according to the second embodiment of the present invention. FIG. 8 shows a plan view of a bag body 76 of FIG. 7.

In the air bag apparatus 70 according to the second embodiment, oblong holes are formed instead of the folded portions 46 of the bag body 30 in the first embodiment. That is to say, the folded portions 46 in the first embodiment are not used in the second embodiment.

More particularly, the air bag apparatus 70 is provided with the inflator 12 inserted into the circular hole 24 at the central portion of the plate-shaped bag holder 20. The inflater12 generates gas by detecting a state in which the vehicle suddenly decelerates. The plate-shaped bag holder 20 is rectangular and substantially in the shape of a box opened upwardly and the inflator 12 is fixed thereto by the bolts 18. In addition, the through holes 28 (FIGS. 2 and 4 are referred to) are formed inside the four edges at the bottom of the plate-shaped bag holder 20. Further, a bag body 76 is disposed at the vehicle occupant side of the plate-shaped bag holder 20 so as to inflate due to the gas generated by the inflator 12.

The bag body 76 is made of a upper cloth 76A and a lower cloth 76B, both of which are stitched together and incorporated at stitched portions 78. A circular hole 80 is formed at the central portion of the lower cloth 76B. The inflator 12 is inserted into the circular hole 80 and is fixed to the plate-shaped bag holder 20 through the flange of the inflator 12 by the bolts 18 together with the lower cloth 76B.

Oblong holes 82 each serving as a connecting means are formed on the four portions of the bag body 76 which are out side of and along the stitched portions 78 provided on the bag body 76, such that the longitudinal sides of the holes 82 are directed to inside of the bag body 76. It should be noted that the innerside inner edges 88 of the oblong holes 82 in the bag body 76 will correspond to the through holes 28 of the plate-shaped bag holder 20 in the state where the bag body 76 is mounted on the plate-shaped bag holder 20. In addition, the plate attachments 52 are disposed on the oblong holes 82 of the bag body 76. Each of the plate attachments 52 is a rectangular plate member and is provided with the through holes 54 (refer to FIG. 2) corresponding to the through holes 28.

Rivets 56 each serving as a connecting means are inserted into each of the through holes 28, 54 and the oblong holes 82. An end portion of the bag body 76 is pressed to the plate-shaped bag holder 20 by a pressing force of the plate attachment 52 in such a degree that the bag body 76 is movable. Namely, when the vehicle is running at an ordinary state, since each of the through holes 28 of the plate-shaped bag holder 20 is positioned beneath an innerside inner edges 88 of each of the oblong holes 82 and each of the through holes 54 of the plate attachments 52 is positioned on the innerside inner edge 88 of each of the oblong holes 82, each of the rivets 56 is inserted into each of the oblong holes 82 in the vicinity of the innerside inner edge 88 thereof.

The rivets 56 are inserted into the through holes 28, 54 and the oblong holes 82, respectively and the plate attachments 52 press the bag body 76 by a pressing force to a degree in which the bag body 30 can move, thereby allowing the bag body 76 to move in relation to the plate-shaped bag holder 20 until each of outerside inner edges 90 of the oblong holes 82 in the bag body 76 abuts on the rivet 56.

Next, operation of the present embodiment will be described.

In accordance with the air bag apparatus 70 with the aforementioned arrangement, when the vehicle is running at an ordinary state, the oblong holes 82 are located at the positions in which the rivets 56 penetrate at the innerside inner edges 88 of the oblong holes 82 in the bag body 76, The bag body 76 is pressed and maintained by a pressing force to a degree in which it can move in relation to the plate-shaped bag holder 20.

Hence, at this time of the sudden deceleration of the vehicle, a great amount of the gas is generated in the inflator 12. The gas is guided into the bag body 76 via the gas-discharging holes 14 so that the bag body 76 inflates. At this time, the portions of the bag body 76 which are outside of the stitched portions are pulled inwardly by the gas, causing the bag body 76 to move until the outside inner edges 90 of the oblong holes 82 in the bag body 76 abut on the rivets 56. Accordingly, the bag body 76 is inflated by a distance at which the rivets 56 are relatively moved within the oblong holes 82 at the outside of the stitched portions 78 of the bag body 76. In this way, the bag body 76 is inflated towards the knees of the vehicle occupant, thereby allowing the bag body 76 to absorb the energy produced when the knees of the vehicle occupant will strike against the vehicle body.

In this way, in accordance with the present embodiment, since the position at which the bag body 76 is connected to the plate-shaped bag holder 20 is moved during the inflation of the bag body 76 by providing the oblong holes 82 on the bag body 76 at the outside of the stitched portions 78, it is possible to accommodate the bag body 76 without folding it. As a result, the apparatus can be made thinner and a sufficient space between the vehicle occupant and the vehicle body can be obtained.

In addition, in accordance with the present embodiment, the oblong holes 82 have been formed on the bag body 76 outside the stitched portions 78 along all four sides thereof. However, the bag body 76 is capable of inflating by providing the oblong holes 82 on the bag body 76 at the outside of the stitched portions 78 which correspond to at least two sides adjacent each other of the four sides thereof, while usual through holes or circular holes can be formed on the bag body 76 so as to correspond to the remaining sides of the bag body 76.

Figure 9:
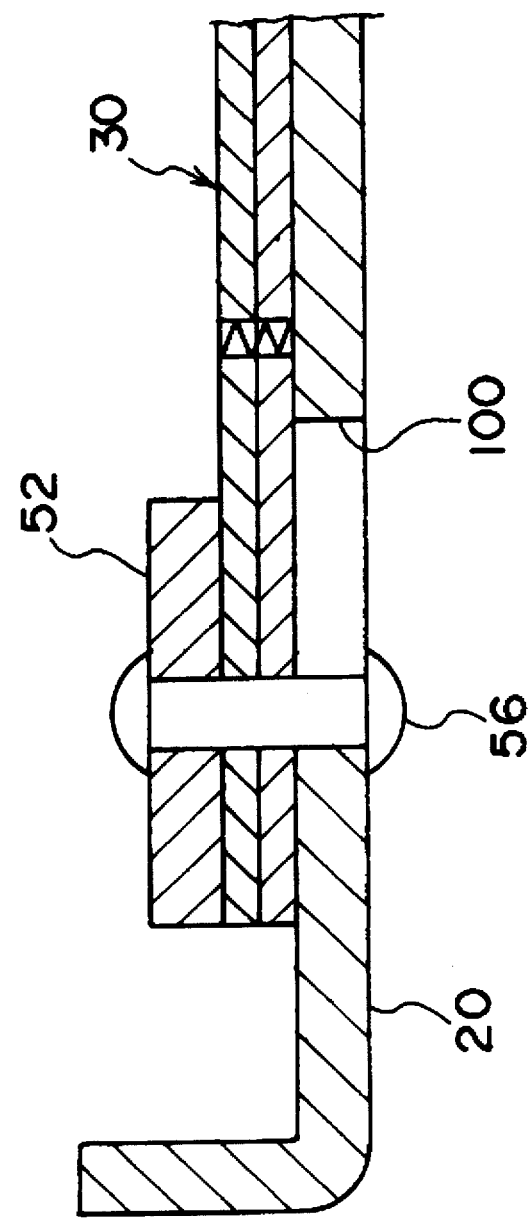
FIG. 9 is a sectional view in which a main portion of the air bag apparatus is enlarged in a modified example of the present invention.

Further, in accordance with both the first and second embodiments, the oblong holes are provide on the bag body. However, as shown in FIG. 9, the through holes provided on the bag body may be ordinary circular holes, while oblong holes 100 may be provided on the plate-shaped bag holder 20. As a result, the bag body 30 is allowed to move together with both the rivets 56 and the plate attachments 52 during the inflation of the bag body.

What is claimed is:

1. An air bag apparatus comprising:
   a bag body inflated towards a vehicle occupant due to gas generated by an inflator when the vehicle decelerates suddenly;
   a plate-shaped bag holder mounted to the vehicle body for supporting said bag body; and
   a connecting means for connecting said bag body to said plate-shaped bag holder such that said bag body is movable within a predetermined range so as to inflate said bag body.

2. An air bag apparatus according to claim 1, wherein said connecting means includes:
   an oblong hole provided in said bag body;
   an axis member inserted into said oblong hole; and
   a pressing member engaged at one end of said axis member and pressing said bag body so as to hold said bag body between the same and said plate-shaped bag holder in a state in which said bag body is not inflated when the vehicle is running in an ordinary state and to move said bag body along the longitudinal direction of said oblong hole when the vehicle decelerates.

3. An air bag apparatus according to claim 1, wherein said bag body is in a generally rectangular shape in plan view, and said connecting means is provided so as to correspond to at least one of two pairs of opposing sides of said bag body.

4. An air bag apparatus according to claim 1, wherein said bag body is in a generally rectangular shape in plan view, and said connecting means is provided so as to correspond to two sides adjacent each other of the four sides of said bag body.

5. An air bag apparatus according to claim 1, wherein said bag body is in a generally rectangular shape in plan view, and said connecting means is provided so as to correspond to at least one side of the two pairs of opposing sides of said bag body and said bag body has a folded portion corresponding to at least one side of the other pair, said folded portion being folded when the vehicle is running in an ordinary state and being unfolded when the vehicle decelerates.

6. An air bag apparatus according to claim 1, wherein said connecting means includes:
   an oblong hole provided in said plate-shaped bag holder;
   an axis member inserted into said oblong hole; and
   a pressing member engaged at one end of said axis member and pressing said bag body so as to hold said bag body between the same and said plate-shaped bag holder in a state in which said bag body is not inflated when the vehicle is running in an ordinary state and to move said bag body along the longitudinal direction of said oblong hole when the vehicle decelerates.

7. An air bag apparatus according to claim 1, wherein said bag body includes an upper cloth and a lower cloth, said upper cloth and said lower cloth being stitched together in a generally rectangular shape constituted by four stitched portions so that the inflating portion is inside said generally rectangular shape, and said connecting means is provided on portions of said bag body which are positioned outside at least one of two pairs of opposing stitched portions of said four stitched portions.

8. An air bag apparatus according to claim 1, wherein said bag body includes an upper cloth and a lower cloth, said upper cloth and said lower cloth being stitched together in a generally rectangular shape constituted by four stitched portions so that the inflating portion is inside said generally rectangular shape, and said connecting means is provided on portions of said bag body which are positioned outside two adjacent ones of said four stitched portions.

9. An air bag apparatus according to claim 1, wherein said bag body includes an upper cloth and a lower cloth, said upper cloth and said lower cloth being stitched together in a generally rectangular shape constituted by four stitched portions so that the inflating portion is inside said generally rectangular shape, said connecting means is provided on a portion of said bag body which is positioned outside of at least one stitched portion in one of the two pairs of two stitched portions opposing each other of said four stitched portions, and said bag body has a folded portion provided inside of at least one stitched portion in the other pair, said folded portion being maintained in a folded state when the vehicle is running in an ordinary state and being unfolded when the vehicle decelerates.

10. An air bag apparatus suitable for being disposed corresponding to the knees of a vehicle occupant comprising:
    an inflator generating gas when the vehicle suddenly decelerates;

a bag body inflated towards the vehicle occupant due to the gas generated by said inflator when the vehicle suddenly decelerates;

a plate-shaped bag holder mounted to the vehicle body for fixing said inflator as well as supporting said bag body; and a connecting means for connecting said bag body to said plate-shaped bag holder such that said bag body is movable within a predetermined range so as to cause said bag body to be inflated.

11. An air bag apparatus according to claim 10, wherein said connecting means includes:

an oblong hole provided in said bag body;

an axis member inserted into said oblong hole; and a pressing member engaged at one end of said axis member and pressing said bag body to said plate-shaped bag holder so as to hold said bag body between the same and said plate-shaped bag holder in a state in which said bag body is not inflated when the vehicle is running at an ordinary state and to move said bag body longitudinally along said oblong hole when the vehicle suddenly decelerates.

12. An air bag apparatus according to claim 10, wherein said bag body is in a generally rectangular shape in plan view, and said connecting means is provided so as to correspond to at least one of two pairs of opposing sides of said bag body.

13. An air bag apparatus according to claim 10, wherein said bag body is in a generally rectangular shape in plan view, and said connecting means is provided so as to correspond to two sides adjacent each other of the four sides of said bag body.

14. An air bag apparatus according to claim 10, wherein said bag body is in a generally rectangular shape in plan view, said connecting means is provided so as to correspond to at least one side of one pair of the two pairs of opposing sides of said bag body, and said bag body has a folded portion corresponding to at least one side of the other pair, said folded portion being folded when the vehicle is running at an ordinary state and being unfolded when the vehicle suddenly decelerates.

15. An air bag apparatus according to claim 10, wherein said connecting means includes:

an oblong hole provided in said plate-shaped bag holder;

an axis member inserted into said oblong hole; and a pressing member engaged at one end of said axis member and pressing said bag body to said plate-shaped bag holder so as to hold said bag body between the same and said plate-shaped bag holder in a state in which said bag body is not inflated when the vehicle is running in an ordinary state and to move said bag body longitudinally along said oblong hole when the vehicle suddenly decelerates.

16. An air bag apparatus according to claim 10, wherein said bag body includes an upper cloth and a lower cloth, said upper cloth and said lower cloth being stitched together in a generally rectangular shape constituted by four stitched portions so that the inflating portion is inside said generally rectangular shape, and said connecting means is provided on portions of said bag body which are positioned outside at least one of two pairs of opposing stitched portions of said four stitched portions.

17. An air bag apparatus according to claim 10, wherein said bag body includes an upper cloth and a lower cloth, said upper cloth and said lower cloth being stitched together in a generally rectangular shape constituted by four stitched portions so that the inflating portion is inside said substantially rectangular shape, and said connecting means is provided on portions of said bag body which are positioned outside two adjacent ones of said four stitched portions.

18. An air bag apparatus according to claim 10, wherein said bag body includes an upper cloth and a lower cloth, said upper cloth and said lower cloth being stitched together in a generally rectangular shape constituted by four stitched portions so that the inflating portion is inside said generally rectangular shape, said connecting means is provided on a portion of said bag body which is positioned outside of at least one stitched portion in one of the two pairs of two stitched portions opposing each other of said four stitched portions, and said bag body has a folded portion provided inside of at least one stitched portion in the other pair, said folded portion being maintained in a folded state when the vehicle is running at an ordinary state and being unfolded when the vehicle suddenly decelerates.

19. An air bag apparatus suitable for being disposed corresponding to the knees of a vehicle occupant comprising:

an inflator generating gas when the vehicle suddenly decelerates;

a bag body including an upper cloth and an lower cloth, said upper cloth and said lower cloth being stitched in a generally rectangular shape constituted by four stitched portions so that the inflating portion is inside said generally rectangular shape, said bag body being inflated towards the vehicle occupant due to gas generated by said inflator;

a plate-shaped bag holder mounted to the vehicle body for fixing said inflator as well as supporting said bag body; and a connecting means provided on portions of said bag body which are positioned outside of one of two pairs of opposing stitched portions of the four stitched portions and connecting said bag body to said plate-shaped bag holder such that said bag body is movable within a predetermined range so as to be inflated.

20. An air bag apparatus according to claim 19, wherein said bag body has folded portions provided on portions of the bag body which are inside of the other pair of two pairs of opposing stitched portions of said four stitched portions, said folded portions being maintained in a folded state when the vehicle is running at an ordinary state and being unfolded when the vehicle suddenly decelerates.

* * * * *